(12) United States Patent
Hormadaly

(10) Patent No.: US 6,989,111 B2
(45) Date of Patent: Jan. 24, 2006

(54) THICK FILM COMPOSITIONS CONTAINING PYROCHLORE-RELATED COMPOUNDS

(76) Inventor: Jacob Hormadaly, Taashur Street 22, 84965 Omer (IL)

( * ) Notice: Subject to any disclaimer, the term of this patent is extended or adjusted under 35 U.S.C. 154(b) by 0 days.

(21) Appl. No.: 10/620,568

(22) Filed: Jul. 16, 2003

(65) Prior Publication Data
US 2004/0043885 A1 Mar. 4, 2004

(30) Foreign Application Priority Data
Jan. 18, 2001 (IL) ................................. 140990

(51) Int. Cl.
*H01B 1/14* (2006.01)

(52) U.S. Cl. .................................. 252/521.1
(58) Field of Classification Search ............ 252/518.1, 252/521.1; 338/22 R
See application file for complete search history.

(56) References Cited

U.S. PATENT DOCUMENTS

| 3,553,103 | A | 1/1971 | Whiting |
| 3,560,410 | A | 2/1971 | Schubert |
| 3,583,931 | A | 6/1971 | Bouchard |
| 3,630,969 | A | 12/1971 | Popowich |
| 3,681,262 | A | 8/1972 | Bouchard |
| 3,682,840 | A | 8/1972 | Van Loan |
| 3,868,334 | A | 2/1975 | Van Loan |
| 4,090,009 | A | 5/1978 | Horowitz |
| 4,101,708 | A | 7/1978 | Larry |
| 4,636,332 | A | 1/1987 | Craig et al. |
| 4,961,999 | A | * 10/1990 | Hormadaly ................. 428/427 |
| 5,439,852 | A | 8/1995 | Hormadaly |
| 5,491,118 | A | 2/1996 | Hormadaly |
| 5,753,571 | A | 5/1998 | Donohue |
| 6,387,539 | B1 | 5/2002 | Subramanian |

OTHER PUBLICATIONS

Haouzi et al "Electric and crystallographic characterizations of pyrochlore type phases neodymium copper ruthenium oxides (Nd2-yCuyRu2O7-y)", Materials Research Bulletin (1986), 21(12), 1489-93 (Abstract Only).*
Mayer-von Kuerthy et al "The semiconductor-metal transition in pyrochlores of the system Ln2-xCuxRu2O7-z . . . ", Zeitschrift fuer Naturforschung, B; Chemical Sciences (1989), 44(7), 750-4 (Abstract Only).*
International Search Report for PCT/IL02/00050 (one page).
International Preliminary Examination Report for PCT/IL02/00050—3 pages.

* cited by examiner

Primary Examiner—Mark Kopec
(74) Attorney, Agent, or Firm—Roach Brown McCarthy & Gruber, P.C.; Kevin D. McCarthy

(57) ABSTRACT

Film compositions are described which can be used as conductive, resistive or insulating films in a wide variety of electronic and light electrical components. Said films comprise a conductive phase based on pyrochlore-related compounds, and a dielectric phase based on glass.

22 Claims, 3 Drawing Sheets

THICK FILM COMPOSITIONS CONTAINING PYROCHLORE-RELATED COMPOUNDS

FIELD OF THE INVENTION

This invention relates to film compositions which are applied to nonconductive substrates to form conductive, resistive films in a wide variety of electronic and light electrical components. It particularly relates to such materials that contain pyrochlore-related compounds as the conductive phase.

BACKGROUND OF THE INVENTION

Thick film materials are known in the art, which are mixtures of metal, glass and/or ceramic powders dispersed in an organic medium. These materials, which are applied to nonconductive substrates to form conductive, resistive or insulating films are used in a wide variety of electronic and light electrical components.

The properties of such thick film compositions depend on the specific constituents of the compositions. Most of such thick film compositions contain three major components. A conductive phase determines the electrical properties and influences the mechanical properties of the final film. A binder, usually a glass and/or crystalline oxide, holds the thick film together and bonds it to a substrate and an organic medium (vehicle) acts as a dispersing medium and influences the application characteristics of the composition and particularly its rheology.

High stability and low process sensitivity are critical requirements for thick film resistors in microcircuit applications. In particular, it is necessary that resistivity ($R_{av}$) of a resistor be stable over a wide range of temperature conditions. Thus, the temperature coefficient of resistance (TCR) is a critical variable in any thick film resistor. Because thick film resistor compositions are comprised of a functional (conductive) phase and a permanent binder phase, the properties of the conductive and the binder phases and their interactions with each other and with the substrate affect both resistivity and TCR.

Heretofore, thick film resistor compositions, and especially the air fired ones, have been formulated with cadmium and lead bearing glasses and Ru-based conducting materials. Some of the Ru-based materials are $RuO_2$—see U.S. Pat. Nos. 3,868,334 and 4,101,708—or lead ruthenate $Pb_2Ru_2O_{6+\delta}$—see U.S. Pat. No. 3,682,840. A family of pyrochlores such as $Bi_2Ru_2O_7$ and many other conducting oxides derived from $Bi_2Ru_2O_7$ are described in U.S. Pat. Nos. 3,583,931 and 3,681,262. The use of these pyrochlores in thick film resistors is described in U.S. Pat. Nos. 3,560,410, 3,553,103 and 3,630,969. Lead and cadmium containing glasses used in thick film resistors have been disclosed by numerous U.S. Patents. U.S. Pat. No. 5,753,571 discloses lead and cadmium free glass compositions, containing specified amounts of bismuth oxide, silica and other oxides, for encapsulating electronic hybrid circuits. U.S. Pat. No. 5,439,852 discloses lead and cadmium free thick film compositions comprising electroconductive particles.

The air fired thick film resistors compositions of the prior art have good properties. However, they have a number of shortcomings: e.g., cadmium containing materials are known carcinogens and lead compounds are highly toxic. Most producers of thick film resistors have addressed the cadmium issue and have developed new Cd-free compositions.

Elimination of lead from thick film resistor composition is more difficult and complex. The difficulty is probably due to the major proportions of lead oxide in the conductive phase and in the glasses. Lead containing glasses have a unique combination of properties such as expansion, viscosity, durability and surface tension, which make them very desirable for thick film resistor compositions. Furthermore, when conductive materials such as $RuO_2$, $Bi_2Ru_2O_7$ and substituted bismuth ruthenate are formulated with Cd- and Pb-free glasses, the resistance range is too small for $RuO_2$ based resistors and the bismuth ruthenate-type conductives interact with these glasses in such a way that partial to complete leaching of $Bi_2O_3$ occurs. This interaction may be described by: $Bi_2Ru_2O_7$+Cd- and Pb-free glass→$RuO_2$+Bi-glass. The interaction of bismuth ruthenate and substituted bismuth ruthenate compounds with leadless glasses limits the resistance range and does not allow control of the resistance. The leaching of $Bi_2O_3$ from the bismuth ruthenate-type conductive phases into the leadless glass may be prevented by the use of bismuthate glasses. However, bismuth ruthenate and substituted bismuth ruthenates, when formulated with bismuthate glasses, produce negative TCR. U.S. Pat. No. 5,491,118 describes lead-free and cadmium—free thick film resistor compositions. Said patent describes the use of $Bi_2Ru_2O_7$, $BiGdRu_2O_7$ and $RuO_2$ conducting phases with alkaline earth and bismuthate glasses. The bismuthate glasses are described in the aforecited U.S. Pat. No. 5,439,852. Low resistance resistors formulated with $RuO_2$ having good TCR are detailed and higher resistance resistors (~30 kΩ) with $BiGdRu_2O_7$ are also detailed. However, at high resistance the TCR characteristics and especially the TCR gap, i.e., HTCR-CTCR are too large.

Thus, there is a need for new resistor compositions which are Cd and Pb-free and comprise a stable, air fired, conductive phase, whose interactions with the leadless glass are small. Moreover, the required resistance range should be in the range of ~10 kΩ/□ to ~mega Ω/□ with good TCR characteristics (Ω/□ depicts surface resistance).

SUMMARY OF THE INVENTION

The invention provides film compositions that comprise, as a conductive phase, pyrochlore-related compounds of the general formula $M_{2-x}Cu_xRu_2O_{6+\delta}$ wherein M is a rare earth metal selected from the rare earth metals of atomic number 60–71 inclusive, X=0.2–0.4, and δ=0–1.

By "pyrochlore-related compounds" are meant herein compounds that have crystal structures close to that of pyrochlore. The structure of all those compounds, as well as of pyrochlore, is identified by characteristic X-ray reflections. The structure of pyrochlore is discussed in U.S. Pat. No. 3,583,931, which lists various references describing it. The content of U.S. Pat. No. 3,583,931 and of the references cited therein is entirely incorporated herein by reference.

Some pyrochlore-related compounds of this invention are known and are described e.g. in A. Haouzi, J. Muller and L. C. Joubert, "Electrical and crystallographic characterization of pyrochlore phases $Nd_{2-y}Cu_yRu_2O_{7-y}$", Mat. Res. Bull., 21, 1489–1493 (1986) and "Synthesis and sintering of mixed oxides with metallic conductivity $Nd_{2-x}Cu_xRu_2O_{7-x}$", J. Phys. Les. 47 (2), Cl-855–859 (1986), where their preparation is also taught. However, according to this invention, they are preferably prepared by a method which comprises firing in air, or at least in a non-reducing atmosphere, an admixture of finely divided particles of CuO, $RuO_2$ and a metal oxide selected from the rare earth metal oxides of atomic number 60–71 inclusive, at a temperature of at least 800° C.

The compositions of the invention also comprise a dielectric phase, which also acts as inorganic binder. Preferably, the dielectric phase consists of, or comprises as a main component, a glass phase. More preferably, according to the invention—the glass phase comprises a blend of two glasses. The first glass comprises by mole % 40–65% $SiO_2$, 1–15% $B_2O_3$, 12–27% BaO, 5–10% SrO, 5–15% CaO, 0–5% MgO, 0–5% $Al_2O_3$, 0–12% alkali metal oxides and 0–3% of a metal fluoride in which the metal is selected from the group consisting of alkali and alkaline earth metals. The second glass comprises glass forming compounds in a total amount of 75 to 85 mole % wherein, said glass forming compounds comprise 40 to 65% $SiO_2$, 10 to 20% $Bi_2O_3$, 0.1 to 3% $Al_2O_3$, and glass modifiers in total amount of 15 to 25%, wherein said glass modifiers comprise 1 to 23% ZnO, 0.1 to 5% CuO, 0.1 to 5% CaO and 0.1 to 2% MgO, all of said percentages being mole percentages. The term "glass-forming compounds", as used herein, includes the compounds each of which is capable of forming a glass by itself upon melting and cooling, such as $SiO_2$, as well as the compounds which are usually known in the art as "conditional glass-forming compounds". Conditional glass-forming compounds, such as $Bi_2O_3$, do not form a glass by themselves upon melting and cooling; however, they form a glass when mixed with another appropriate compound. Suitable glass-forming compounds, as defined above, may be, in addition to $SiO_2$, $Bi_2O_3$, and $Al_2O_3$, compounds selected, for example, from among the group consisting of $B_2O_3$, $GeO_2$, $P_2O_5$, $Sb_2O_3$, $TeO_2$, $TiO_2$ and $ZrO_2$ or mixtures thereof. Among these compounds, most preferred are $B_2O_3$, in an amount of at most 15 mole %, $TiO_2$ and/or $ZrO_2$, the sum of the amounts of said $TiO_2$ and/or $ZrO_2$ being at most 5 mole % of the total glass composition. The total amount of all glass forming compounds, i.e., $SiO_2$, $Bi_2O_3$, and $Al_2O_3$ and the optional additional glass forming compounds, which are preferably selected from the group consisting of $B_2O_3$, $GeO_2$, $P_2O_5$, $Sb_2O_3$, $TeO_2$, $TiO_2$ and $ZrO_2$ or mixtures thereof, is 75 to 85 mole % of the total composition.

The term "glass modifiers" is herein used to define a class of oxides and halogen compounds which do not possess the ability to form a glass by themselves upon melting and cooling, nor when combined with additional compounds, other than, of course, compounds belonging to the class of glasses forming compounds described above. However, the glass modifiers are capable of modifying the chemical and physical properties of the glasses containing them. ZnO, CaO, CuO and MgO are known in the art as glass modifiers. Suitable glass modifiers which are optionally included in the glass compositions according to the present invention, in addition to ZnO, CaO, CuO and MgO, may be selected, for example, from the group consisting of SrO, BaO, oxides and/or fluorides of alkali metals, oxides of transition metals having an atomic number between 24 to 28, inclusive, or mixtures thereof. The total amount of all glass modifiers present in the glass composition—i.e., ZnO CaO, CuO and MgO, and the optional additional glass modifiers, which are preferably selected from the group consisting of SrO, BaO, oxides and/or fluorides of alkali metals, oxides of transition metals having an atomic number between 24 to 28, inclusive, or mixtures thereof—is 15 to 25 mole % of the total composition.

The above definitions of the terms "glass-forming compounds" and "glass modifiers" are based on the general properties of the compounds as they are known and accepted in the art.

The dielectric phase of the compositions of the invention may include, in addition to or in place of glasses, other dielectrics, in particular metal oxides, for example $Al_2O_3$, $SiO_2$, $ZrSiO_4$, $ZrO_2$ and aluminosilicates.

In order that the film compositions of the invention be adapted to be applied onto a substrate, it is preferred that they should comprise an organic vehicle. The organic vehicle does not critically affect the electrical properties of the film compositions. Preferred types of such binders will be listed hereinafter.

Optionally, and in general preferably, the film compositions of the invention also include fillers, preferably chosen from the group consisting of $Al_2O_3$, $SiO_2$, $ZrSiO_4$, $ZrO_2$ and aluminosilicates.

In a preferred embodiment, the invention comprises screen printable thick film paste compositions, suitable for thick film resistor application, comprising
 a) a dispersion of finely divided particles of the pyrochlore—related compound corresponding to the formula $M_{2-x} Cu_x Ru_2 O_{6+\delta}$ wherein M is a rare earth metal selected from the rare earth metals of atomic number 60–71 inclusive, X=0.2–0.4, $\delta$=0–1;
 b) the blend of glasses described hereinbefore, and;
 c) dielectrics selected from $SiO_2$, $ZrSiO_4$, $Al_2O_3$, $ZrO_2$ and aluminosilicates.

More preferably, in the above chemical formula M is Neodymium Nd.

The invention further comprises a method of making film compositions by preparing a powdered mixture of a) 5–90% by weight of an oxide of the formula $Cu_x M_{2-x} Ru_2 O_{6+\delta}$ wherein M is a rare earth metal selected from the rare earth metals of atomic number 60–71 inclusive, x is a number in the range of 0.25 to 0.4, and $\delta$ is a number in the range of 0 to 1; and b) 95–10% by weight of dielectric materials.

Preferably, said method further comprises dispersing the powdered mixture in a liquid organic vehicle. Also preferably, the oxide is chosen from the group consisting of $Nd_{1.70} Cu_{0.30} Ru_2 O_{6+\delta}$, $Nd_{1.75} Cu_{0.25} Ru_2 O_{6+\delta}$, and their mixtures wherein $\delta$ is a number in the range of 1 to 0; and the dielectric materials are chosen from the group consisting of glasses, oxides selected from $ZrSiO_4$, $Al_2O_3$, $SiO_2$, and mixture thereof.

The invention further comprises a method of preparing pyrochlore-related compounds, as hereinbefore defined, which comprises firing an admixture of finely divided particles of CuO, $RuO_2$ and a metal oxide selected from the rare earth metal oxides of atomic number 60–71 inclusive, at a temperature of at least 800° C., in a non-reducing atmosphere. Particularly, said method is used for preparing compounds having the formula $Nd_{2-x} Cu_x Ru_2 O_{6+\delta}$, in which case it comprises firing in air an admixture of finely divided particles of $Nd_2O_3$, CuO and $RuO_2$ at a temperature of 1000–1200° C.

DETAILED DESCRIPTION OF PREFERRED EMBODIMENTS

A.—Pyrochlore-Related Compounds

Figure 1:
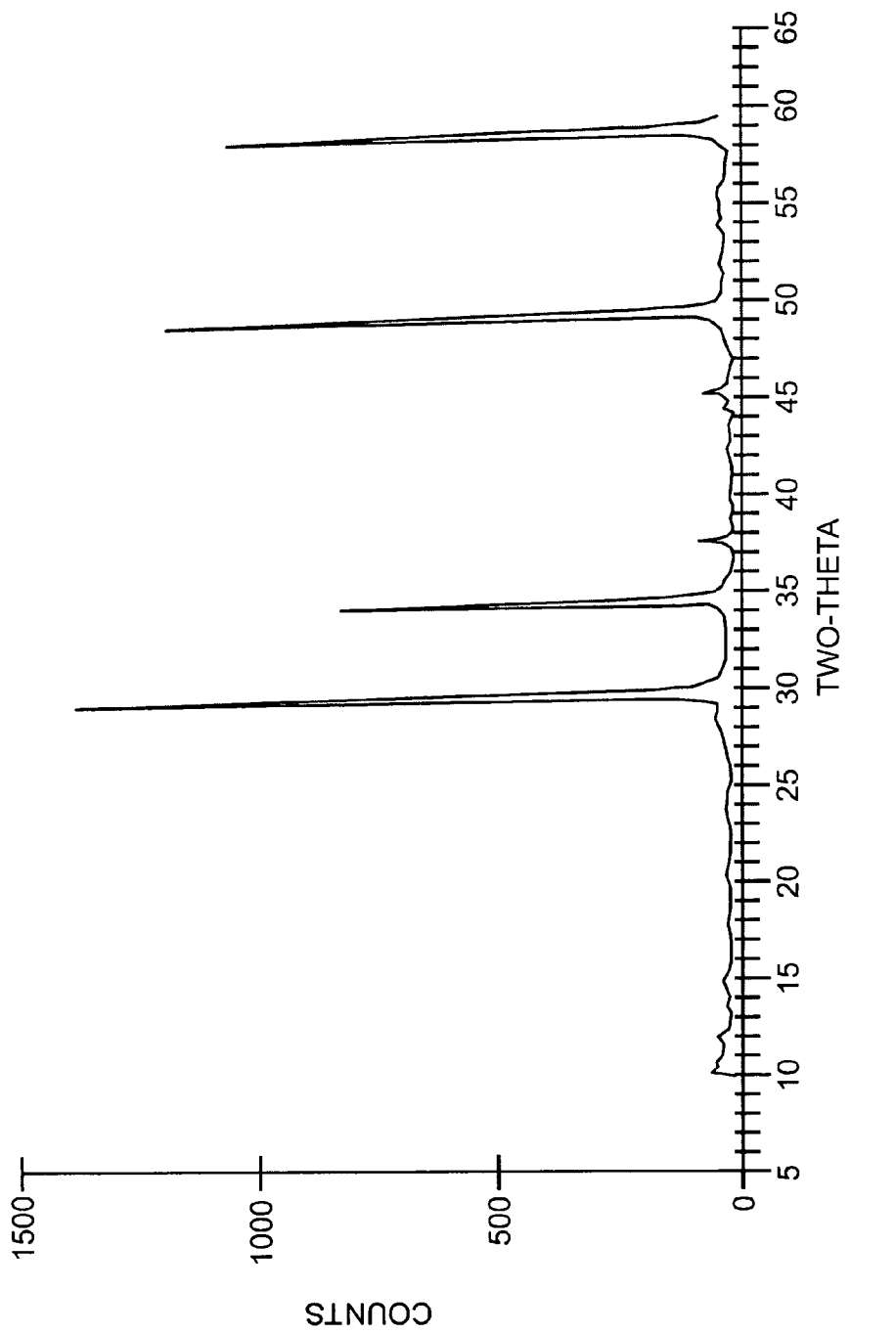
FIGS. 1 and 2 are X-ray diffraction diagrams of pyrochlores according to embodiments of the invention.

The X-ray analysis shows that the compounds hereinbefore defined have pyrochlore-related crystal structure. Hereinafter, they may be designated, for brevity's sake, by the sole term "pyrochlore".

As has been said, they are preferably prepared by firing an admixture of finely divided particles of CuO, $RuO_2$ and a metal oxide selected from the rare earth metal oxides of atomic number 60–71 inclusive, at a temperature of at least 800° C. The compounds having the formula $Nd_{2-x} Cu_x Ru_2 O_{6+\delta}$ are preferably prepared by firing as admixture of finely divided particles of $Nd_2O_3$, CuO and $RuO_2$ at a temperature of 800° C. to 1200° C., preferably of 1000–1200° C., in a non-reducing atmosphere, preferably in air.

The particle size of the pyrochlore components, i.e. $Nd_2O_3$, CuO and $RuO_2$, is not critical to the process of making the pyrochlore. However, it is preferred that they be finely divided to facilitate thorough mixing and complete reaction. A particle size of 0.1 to 80 $\mu$m is normally preferred. Some of the pyrochlore components such as $Nd_2O_3$ and CuO may be introduced as nitrates $Nd(NO_3)_3 \cdot xH_2O$, $Cu(NO_3)_2 \cdot xH_2O$. The copper component maybe introduced as an organic salt or $Cu_2O$. Said components are typically at least 99 wt % pure and preferably have a 99.5 wt % or even higher purity.

B. Inorganic Binder

Glass is most frequently used as inorganic binder for resistors containing the said pyrochlores and can be virtually any lead- and cadmium-free glass composition having a fiber softening point of below 800° C. Preferred glass frits are used, such as the borosilicate frits, e.g. barium, calcium, other alkaline earth and alkali borosilicate frits, in combination with bismuthate glass compositions, disclosed in U.S. patent application Ser. No. 09/143134, the contents of which is introduced herein by reference. The preparation of the alkaline earth borosilicate glass frits is well known and consists, for example, in melting together the constituents of the glass and pouring such molten composition into water to form the frit. The batch ingredients may, of course, be any compound that will yield the desired oxides under the usual conditions of frit production. For example, boric oxide will be obtained from boric acid, silicon dioxide from flint, barium oxide from barium carbonate; etc. The glass frit is preferably milled in a ball mill with water to reduce the particle size of the frit and to obtain a frit of substantially uniform size.

The preferred glass frits for use in the resistor compositions of the invention are those Cd- and Pb-free frits comprising a combination of alkaline earth borosilicate frits with bismuthate frits disclosed in U.S. patent application Ser. No. 09/143134. The preferred alkaline earth borosilicate frits are those comprising, in mole percentages, 40–65% $SiO_2$, 1–15% $B_2O_3$, 12–27% BaO, 5–10% SrO, 5–15% CaO, 0–5% MgO, 0–5% $Al_2O_3$, 0–12% alkali metal oxides and 0–3% of a metal fluoride in which the metal is selected from the group consisting of alkali and alkaline earth metals.

The glasses are prepared by conventional glass-making techniques, by mixing the desired components in the desired proportions and heating the mixture to form a melt. As is well known in the art, heating is conducted to a peak temperature and for a time such that the melt becomes entirely liquid and homogeneous. Preferably, in carrying out the invention, the components are premixed by shaking in a polyethylene jar with plastic balls and then are melted in a platinum crucible at the desired temperature. The melt is heated at a peak temperature of 1100° C.–1400° C. for a period of 1–1.5 hours. The melt is then poured into cold water. The maximum temperature of the water during quenching is kept as low as possible by increasing the volume ratio of water to melt. The crude frit, after separation from water, is freed from residual water by drying in air or by displacing the water by rinsing with methanol. The crude frit is then ball milled for 3–15 hours in alumina containers using alumina balls. Alumina picked up by the frit, if any, is not within the observable limit, as measured by x-ray diffraction analysis. After discharging the milled frit slurry from the mill, excess solvent is removed by decantation and the frit powder is air-dried at room temperature. The dried powder is then screened through a 325 mesh screen to remove any large particles.

The major two properties of the frit are that it aids the liquid phase sintering of the inorganic crystalline particulate materials and forms noncrystalline (amorphous) or crystalline materials by devitrification during the heating-cooling cycle (firing cycle) in the preparation of thick film resistors. This devitrification process can yield either a single crystalline phase having the same composition as the precursor noncrystalline (glassy) material or multiple crystalline phases with different compositions from that of the precursor glassy material.

C. Organic Vehicle

The organic vehicle is usually a resin. The most frequently used resin is ethyl cellulose. However, resins such as ethylhydroxy ethyl cellulose, wood rosin, mixtures of ethyl cellulose and phenolic resins, polymethacrylates of lower alcohols, and monobutyl ether of ethylene glycol monoacetate can also be used.

The most widely used solvents for dissolving the polymers contained in the organic vehicle (which may contain other materials, such as surfactants, antioxidants, etc.) for thick film applications, are terpenes such as alpha- or beta -terpineol, or mixtures thereof with other solvents such as kerosene, dibutylphthalate, dibutyl carbitol, butyl carbitol acetate, hexylene glycol, and high boiling alcohols and alcohol esters. Various combinations of these and other solvents are formulated to obtain the desired viscosity and volatility requirements for each application.

Among the thixotropic agents, which may constitute the organic vehicle, which are commonly used are hydrogenated castor oil and derivatives thereof and ethyl cellulose. It is, of course, not always necessary to incorporate a thixotropic agent since the solvent/resin properties coupled with the shear thinning inherent in any suspension may alone be suitable in this regard.

The ratio of organic medium to solids in the dispersions or suspensions can vary considerably and depends upon the manner in which the dispersion is to be applied and the kind of organic medium used. Normally, to achieve good coverage the dispersions will contain 60–90 wt % of solids and 40–10 wt % of organic medium. Such dispersions are usually of semifluid consistency and are referred to commonly as "pastes".

Pastes are conveniently prepared on a three-roll mill. The viscosity of the pastes is typically within the following ranges when measured at room temperature on Brookfield viscometers at low, moderate and high shear rates:

| Shear Rate (sec$^{-1}$) | Viscosity (Pa · s) | |
| --- | --- | --- |
| 0.2 | 100–5000 | — |
|  | 300–2000 | Preferred |
|  | 600–1500 | Most preferred |
| 4 | 40–400 | — |
|  | 100–250 | Preferred |
|  | 140–200 | Most preferred |
| 384 | 7–40 | — |
|  | 10–25 | Preferred |
|  | 12–18 | Most preferred |

The amount and type of organic vehicle used is determined mainly by the final desired formulation viscosity and print thickness.

D—Formulation and Application of the Compositions

In the preparation of the compositions of the present invention, the particulate inorganic solids are mixed with the organic vehicle and dispersed with suitable equipment, such as a three-roll mill or a muller, to form a suspension, resulting in a composition for which the viscosity will be in range of about 100–150 Pa.s at a shear rate of 4 sec$^{-1}$. In the examples which follow, the composition is prepared in the following manner: The ingredients of the paste, minus about 5 wt % of the estimated organic components which will be required, are weighed together in a container. The components are then vigorously mixed to form a uniform blend; then the blend is passed through dispersing equipment such as a three-roll mill to achieve a good dispersion of particles. A Hegman gauge is used to determine the state of dispersion of the particles in the paste. This instrument consists of a channel in a block of steel that is 25 µm deep (1 mil) at one end and ramps up to the metal surface—0" depth—at the other end. A blade is used to draw down paste along the length of the channel. Scratches will appear in the channel where the agglomerates diameter is greater than the channel depth. A satisfactory dispersion will give a fourth scratch point of 10–8 µm typically. The point at which half of the channel is uncovered with a well dispersed paste is between 3 and 8 µm typically. The number of continuous scratches is counted. If the fourth scratch starts at 20 µm and the channel is covered by paste at 10 µm, this indicates a poorly dispersed suspension.

The remaining 5% of the organic components of the paste is then added and the resin content of the paste is adjusted to bring the viscosity when fully formulated to between 140 and 200 Pa.s at a shear rate of 4 sec$^{-1}$.

The composition is then applied to a substrate such as alumina ceramic, usually by the process of screen printing, to wet thickness of about 30–80 microns, preferably 35–70 microns and most preferably 40–50 microns. The resistor compositions of this invention can be printed onto the substrates either by using an automatic printer or a hand printer in the conventional manner. Preferably automatic screen stencil techniques are employed using 200 to 325 mesh screen. The printed pattern is then dried at below 200° C., e.g., about 150° C., for about 5–15 minutes before firing. Firing to effect sintering of both the inorganic binder and the finely divided particles of conductive phase is preferably done in a well ventilated belt conveyor furnace with a temperature profile that will allow burnout of the organic matter at about 300°–600° C., a period of maximum temperature of about 800°–950° C. lasting about 5–15 minutes, followed by a controlled cooldown cycle to prevent oversintering, unwanted chemical reactions at intermediate temperatures or substrate fracture which can occur from too rapid cooldown. The overall firing procedure will preferably extend over a period of about 1 hour, with 20–25 minutes to reach the firing temperature, about 10 minutes at the firing temperature and about 20–25 minutes in cooldown. In some instances, total cycle times as short as 30 minutes can be used.

E—Sample Preparation a) Thick Film Resistors

Samples to be tested for temperature coefficient of resistance (TCR) are prepared as follows:

A pattern of the resistor formulation to be tested is screen printed upon each of ten coded Alsimag 614 1×1" ceramic substrates and allowed to equilibrate at room temperature and then dried at 150° C. The mean thickness of each set of ten dried films before firing must be 22–28 microns as measured by a light section microscope. The dried and printed substrate is then fired for about 60 minutes using a cycle of heating at 35° C. per minute to 850° C., dwell at 850° C. for 9 to 10 minutes and cooled at a rate of 30° C. per minute to ambient temperature.

b) Pellets

The ingredients which consist of glasses, conductive phase and dielectric were ground together in an agate mortar using analytical ethanol to ensure proper mixing. A few drops of polyvinyl alcohol solution in water were added to the dry mixed powder to increase the green strength of the pellets. Pellets were prepared by pressing ~0.2 g of mixed ingredients in a Carver press; typically, 4000 lbs on a pellet die of 6 mm diameter result in a pressure of ~5000 kg/cm$^2$. The pellets were sintered by placing them on platinum foil and heating them in a box furnace using the temperature profile of FIG. 3.

After sintering, the pellets dimensions (diameter and thickness) were recorded and one face of the pellet was coated with silver paste (DuPont 6160 Ag conductor composition).

Figure 3:
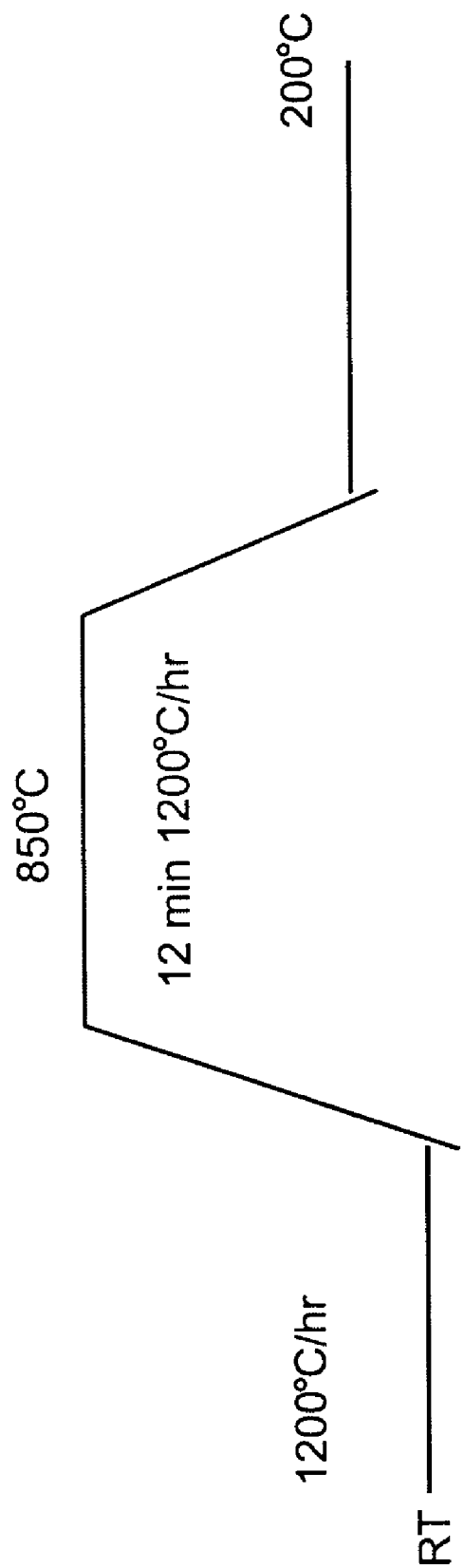
FIG. 3 is a heating diagram used in sintering compositions according to embodiments of the invention.

After drying the silver paste, the pellets were placed on a 96% alumina substrate and were heated to 850° C. using the sintering profile of FIG. 3. After the second heating, the second face of each pellet was coated with Ag paste, dried and subjected to the same heating profile of FIG. 3. The above detailed procedure of pellet preparation required three heatings at peak firing of 850° C. (FIG. 3), and is referred to as process I. A second firing procedure was the cofiring of the green pellets with the dried silver paste on both faces of the pellet, and is referred to as process II. Process II uses the heating profile of FIG. 3, and the substrate on which the pellets are placed is 96% alumina.

After sintering and coating with silver paste, the electrical resistances of the pellets were measured (two probes technique) at room temperature and 125° C. Resistivity and temperature coefficient of resistance (TCR) were estimated from the measured resistance and pellet dimensions. Temperature coefficient of resistance for the range of 25° C. to 125° C. is referred to as hot TCR or HTCR and for −55° C. to 25° C. range as cold TCR or CTCR.

F—Resistance Measurement and Calculations

Substrates prepared as described above are mounted on terminal posts within a controlled temperature chamber and electrically connected to a digital ohmmeter. The temperature in the chamber is adjusted to 25° C. and allowed to equilibrate, after which the resistance of each substrate is measured and recorded. The temperature of the chamber is then raised to 125° C. and allowed to equilibrate, after which the resistance of the substrate is again measured and recorded. The temperature of the chamber is then cooled to −55° C. and allowed to equilibrate and the cold resistance is measured and recorded.

The temperature of the chamber is then cooled to −55° C. and allowed to equilibrate and the cold resistance measured and recorded. The hot and cold temperature coefficients of resistance (TCR) are calculated as follows:

$$\text{Hot } TCR = \frac{R_{125° \text{ C.}} - R_{25° \text{ C.}}}{R_{25° \text{ C.}}} \times (10,000) \text{ ppm/° C.}$$

$$\text{Cold } TCR = \frac{R_{-55° \text{ C.}} - R_{25° \text{ C.}}}{R_{25° \text{ C.}}} \times (-12,500) \text{ ppm/° C.}$$

The values of $R_{25° C.}$ and Hot and Cold TCR are averaged and $R_{25° C.}$ values are normalized to 25 microns dry printed thickness and resistivity is reported as ohms per square at 25 microns dry print thickness. Normalization of the multiple test values is calculated with the following relationship:

Normalized Resistance=$R_{mes}.d_{mes}/25$ μm where $R_{mes}$ is the average measured resistance and $d_{mes}$ is the average measured thickness Some samples were measured manually by two probes technique at room temperature, 125° C. and −55° C., hot and cold TCR were estimated using the equations given above.

G—Coefficient of Variance

The coefficient of variance (CV) is a function of the average and individual resistances for resistors tested and is represented by the relationship $\sigma/R_{av}$, wherein $$\sigma = \sqrt{\frac{\sum_i (R_i - R_{av})^2}{n-1}}$$

$R_i$=Measured resistance of individual sample.
$R_{av}$=calculated average resistance of all samples ($\Sigma_i R_i/n$)
n=number of samples
CV=$\sigma/R_{av}$X100

EXAMPLES 1 AND 2

The compounds $Nd_{1.75} Cu_{0.25} Ru_2 O_{6+\delta}$ and $Nd_{1.7} Cu_{0.3} Ru_2 O_{6+\delta}$, briefly referred to hereinafter as "Example 1" and "Example 2" respectively, were synthesized by solid state reaction of the appropriate amounts of CuO, $Nd_2O_3$ and $RuO_2$. The well ground mixtures of the oxides in the appropriate proportions were placed in platinum crucibles and heated in an electric furnace in air at 1100–1200° C.

Example 1 was heated at 1100° C. for 40 to 60 hrs with intermittent grindings. Example 2 was subjected to the same thermal treatment as Example 1 and further heated 8 hrs at 1200° C. Example 1 was vibratory milled in a Sweco vibratory mill to provide finely divided powder. Example 2 was used as such with no grindings.

Figure 2:
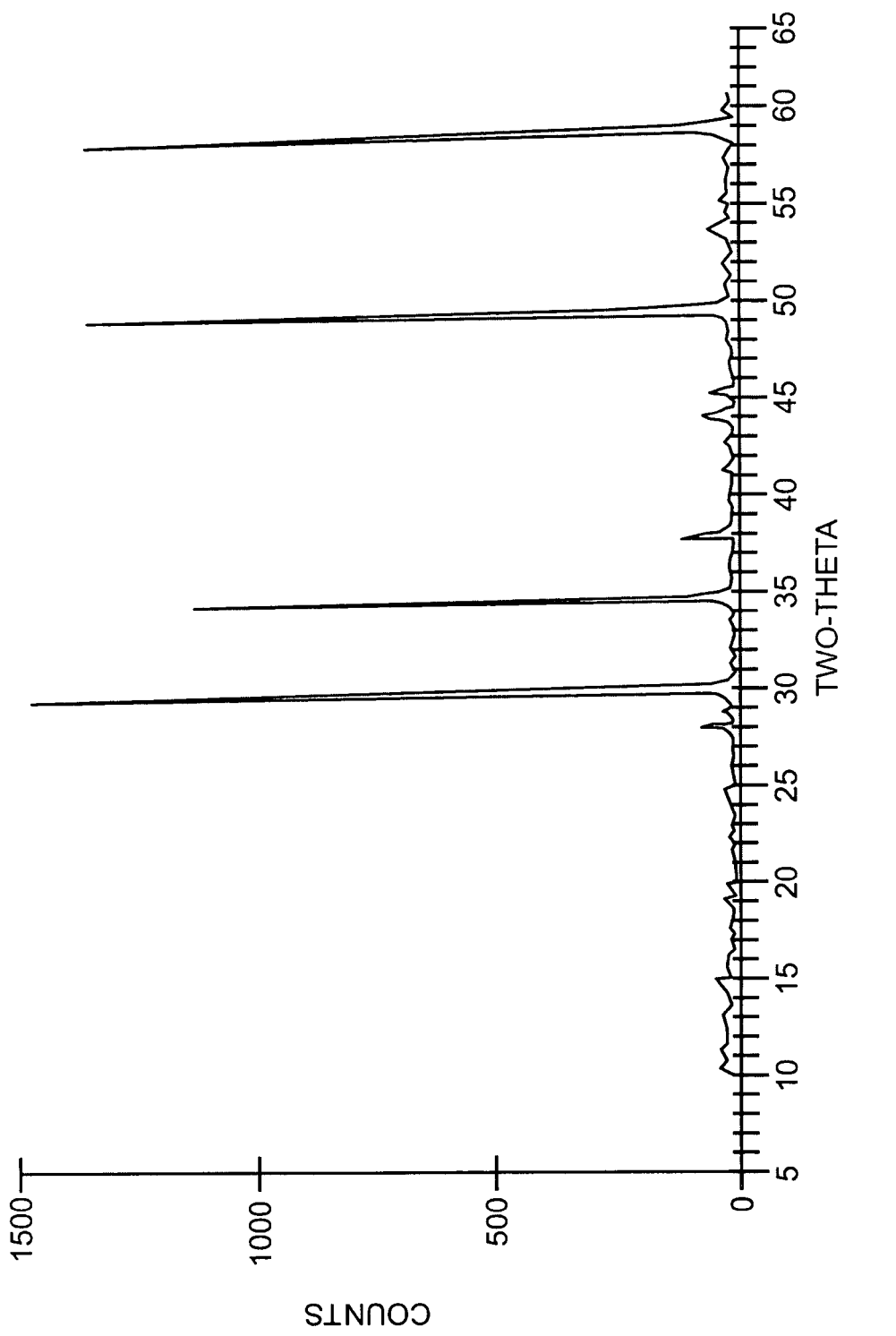

X-ray diffraction of the resulting black powders are given in FIGS. 1 and 2 for Examples 1 and 2 respectively. The x-ray diffraction analysis shows that these compounds are pyrocholore-type.

Papers published by A. Haouzi, J. Muller and L. C. Joubert, "Electrical and crystallographic characterization of pyrochlore phases $Nd_{2-y} Cu_y Ru_2 O_{7-y}$", Mat. Res. Bull., 21, 1489–1493 (1986) and "Synthesis and sintering of mixed oxides with metallic conductivity $Nd_{2-x} Cu_x Ru_2 O_{7-x}$", J. Phys. Les. 47 (2), Cl-855–859 (1986), contain data on the synthesis and properties of these pyrochlores.

EXAMPLES 3–10

The glasses were prepared by the above method, milled and characterized by Differential Thermal Analysis (DTA) and dilatometer. The glass transition temperature (Tg) as obtained from DTA and dilatometric measurements were in the range of 300°–550° C.

Glasses in accordance with the invention are given in Table I.

Compositions in mole % are given in Table I for the experimental glasses (examples 3–8) and in wt % for two commercial lead containing glass frits made by-Hammond Lead Products Inc., Hammond, Ind. USA. The commercial glass frits were vibratory milled.

TABLE I

| | Glass compositions in mole % (ex.3–8) and in wt % (ex 9–10) Example No. | | | | | | | |
|---|---|---|---|---|---|---|---|---|
| | 3 | 4 | 5 | 6 | 7 | 8 | 9 | 10 |
| BaO | 27.0 | 22.20 | 15.0 | — | — | — | — | — |
| SrO | 8.0 | 7.11 | 5.0 | — | — | — | — | — |
| CaO | 5.0 | 4.44 | 12.0 | 4.00 | 4.27 | 2.00 | — | — |
| MgO | 5.0 | — | — | 1.00 | 2.45 | 1.0 | — | — |
| CuO | — | — | — | 3.00 | 3.10 | 2.0 | — | — |
| ZnO | — | — | — | 17.00 | 13.67 | 10.0 | — | — |
| $Bi_2O_3$ | — | — | — | 17.00 | 17.89 | 20.0 | — | — |
| $K_2O$ | — | 6.22 | 3.0 | — | — | — | — | — |
| PbO | — | — | — | — | — | — | 65.0 | 65.0 |
| $Al_2O_3$ | — | — | — | 2.00 | 3.31 | 2.0 | 1.00 | 3.00 |
| $B_2O_3$ | 5.00 | 5.00 | 10.0 | — | — | — | — | — |
| $SiO_2$ | 50.0 | 55.00 | 55.0 | 56.0 | 55.31 | 63.0 | 34.0 | 32.0 |

EXAMPLES 11–17

Pellets Study

The ingredients which consist of glasses, conductive phase and dielectric were ground together in an agate mortar using analytical ethanol to ensure proper mixing. A few drops of polyvinyl alcohol solution in water were added to the dry mixed powder to increase the green strength of the pellets. Pellets were prepared by pressing ~0.2 g of mixed ingredients in a Carver press; typically, 4000 lbs on a pellet die of 6 mm diameter were used, a pressure of ~5000 Kg/cm². Most of the pellets were sintered by placing them on platinum foil and heating them in a box furnace using the temperature profile of FIG. 3.

After sintering, the pellets' dimensions (diameter and thickness) were recorded and one face of the pellet was coated by silver paste (DuPont 6160).

After drying the silver paste, the pellets were placed on a 96% alumina substrate and were heated to 850° C. using the sintering profile of FIG. 3. After the second heating, the second face of each pellet was coated with silver paste, dried and subjected to the same heating profile of FIG. 3. The above detailed procedure of pellet preparation required three heatings at peak firing of 850° C. (FIG. 3), and is referred to as process I. A second firing procedure was the cofiring of the green pellets with the dried silver paste on both faces of the pellet, and is referred to as process II. Process II profile made use of the temperature profile of FIG. 3 and the substrate on which the pellets were placed was 96% alumina.

After sintering and Ag coating, the electrical resistances of the pellets were measured (two probes technique) at room temperature and 125° C. Resistivity and temperature coefficient of resistance (TCR) were estimated from the measured resistance and pellet dimensions. Temperature coefficient of resistance for the range of 25° C. to 125° C. is referred to as hot TCR or HTCR and for −55° C. to 25° C. range as cold TCR or CTCR.

Pellets compositions in wt % are given in Table II. Typically 4–6 pellets were prepared for each composition. The pellets are identified by numbers added to the composition code; for example pellets number 3 and 5 of Example 15 composition are coded 15-3 and 15-5 respectively. Pellets resistances, dimensions after sintering, estimated resistivities and the type of processing schedule are collected in Table III.

Compositions of Examples 11, 12 and 13 illustrate the effect of increasing filler (zircon) concentration for constant conductive phase concentration and fixed ratio of the glasses. Table III shows that the resistivity increases in the order of $\rho_{11} > \rho_{12} > \rho_{13}$ and the TCR increases monotonically with the filler concentration.

The compositions of Examples 14 to 17 were formulated with one glass which is harder than the glass of Example 6, which is bismuthate glass. Conductive phase concentration was kept at fairly low level to assess the high resistance range of these compositions. Table III shows that the glass of Example 4 imparts larger TCR than the mixed glasses system (Examples 11, 12 and 13) and the resistivity is very high at 10 wt % conductive phase concentration. At fixed conductive phase concentration of 15 wt % and increasing filler concentration, samples 15, 16 and 17 show that the resistivity decreases with the increase in the filler concentration and the TCR increases monotonically.

TABLE II

Pellets composition in wt %

| Ingredients | Example No. | | | | | | |
|---|---|---|---|---|---|---|---|
| | 11 | 12 | 13 | 14 | 15 | 16 | 17 |
| Ex. 4 glass | 22.5 | 21.25 | 20.0 | 80.0 | 75.0 | 70.0 | 65.0 |
| Ex. 6 glass | 22.5 | 21.25 | 20.0 | — | — | — | — |
| Ex 2. Conductive phase | 50.0 | 50.0 | 50.0 | 10.0 | 15.0 | 15.0 | 15.0 |
| Zr SiO$_4$ | 5.0 | 7.50 | 10.0 | 10.0 | 10.0 | 15.0 | 20.0 |

TABLE III

Resistances (Ω), resistivities (Ω cm), dimensions and processing procedure of pellets.

| Example No. | Dimensions | | Resistance (Ω) | | Resistivity (Ω cm) | | Processing |
|---|---|---|---|---|---|---|---|
| | D (mm) | H (mm) | RT | 125° C. | RT | TCR (ppm/° C.) | Procedure |
| 11-1 | 5.54 | 1.86 | 0.870 | 0.920 | 1.13 | 574.7 | Process I |
| 11-2 | 5.75 | 2.85 | 1.066 | 1.120 | 0.97 | 506.6 | ″ |
| 11-3 | 5.41 | 1.71 | 0.946 | 0.994 | 1.28 | 507.4 | ″ |
| 12-1 | 5.61 | 1.98 | 0.903 | 0.957 | 1.13 | 598.0 | ″ |
| 12-2 | 5.64 | 1.37 | 0.677 | 0.217 | 1.24 | 590.8 | ″ |
| 12-3 | 5.55 | 1.31 | 0.641 | 0.682 | 1.19 | 639.6 | ″ |
| 13-1 | 5.62 | 1.14 | 0.421 | 0.451 | 0.92 | 712.6 | ″ |
| 13-2 | 5.73 | 1.15 | 0.385 | 0.416 | 0.86 | 805.2 | ″ |
| 13-3 | 5.69 | 1.02 | 0.340 | 0.369 | 0.85 | 852.9 | ″ |
| 14-1 | 5.47 | 2.11 | 23405 | 26960 | 26019 | 1518.9 | ″ |
| 14-2 | 5.60 | 2.19 | 16512 | 19410 | 18575 | 1755.1 | ″ |
| 14-3 | 5.41 | 2.32 | 61070 | 69710 | 60573 | 1414.8 | ″ |
| 15-1 | 5.55 | 2.03 | 212 | 275 | 252.9 | 2971.7 | ″ |
| 15-2 | 5.71 | 2.64 | 252 | 325 | 244.6 | 2896.8 | ″ |
| 15-3 | 5.65 | 2.98 | 329 | 421 | 416.1 | 2796.4 | ″ |
| 16-1 | 5.79 | 1.92 | 2.86 | 3.48 | 2.94 | 2167.8 | ″ |
| 16-2 | 5.71 | 1.58 | 3.02 | 3.61 | 4.91 | 1953.6 | ″ |
| 16-3 | 5.80 | 1.64 | 2.92 | 3.51 | 4.70 | 2020.5 | ″ |
| 17-1 | 5.67 | 1.07 | 865 | 1076 | 2044.3 | 2439.3 | ″ |
| 17-2 | 5.69 | 1.13 | 1245 | 1511 | 2808.0 | 2136.5 | ″ |
| 17-3 | 5.65 | 1.04 | 2059 | 2529 | 4956.7 | 2282.7 | ″ |
| 14-4 | | | * | | | | Process II |
| 14-5 | | | * | | | | ″ |
| 15-4 | | | * | | | | ″ |
| 15-5 | | | * | | | | ″ |
| 16-4 | | | * | | | | ″ |
| 16-5 | | | * | | | | ″ |
| 17-4 | | | 303.1 | | | | ″ |
| 17-5 | | | 337.0 | | | | ″ |

* very high resistance > 256 MΩ

Thick film pastes were prepared on a three roll mill or Hoover muller. The preparation using the three roll mill was described above and the procedure for the muller was: ~10 g batch was prepared by mixing 7 g solids with 3 g of organic materials. Mixing was done on the muller; which produces an action of shearing the paste ingredients between two glass disks, where one of them is stationary and the second is rotating. Organic materials used were solutions of ethyl cellulose in solvents such as terpineol and dibutylcarbitol. Pastes were screen printed (AMI screen printer model 465) onto 1"×1" 96% alumina substrates. Prior to resistor paste printing the alumina substrates were metallized with silver paste, DuPont 6160. All pastes processing, after drying stage of 20 minutes at 125° C., were done in a belt furnace (BTU, 4 zone) using standard 850° C. profile.

Electrical properties were measured by two probes technique using Keithly 197 and Fluke meters. Standard techniques were used to measure resistances at 125° C. and minus 55° C. for HTCR and CTCR estimations. Two pastes were prepared on the muller using Ex. 1 conductive phase, Ex. 7 glass and zircon. These pastes and 1:1 blend between them constitute Examples 18, 19 and 20. Compositions and electrical properties of these Examples are given in Table IV.

TABLE IV

Composition in wt % and electrical properties

| | Example No. | | |
|---|---|---|---|
| | 18 | 19 | 20 |
| Ex. 1 Conductive phase | 20.0 | 30.0 | 40.0 |
| Ex. 7 Glass | 45.0 | 35.0 | 25.0 |
| Zr SiO$_4$ | 5.0 | 5.0 | 5.0 |
| organics | 30.0 | 30.0 | 30.0 |
| R (Ω/□/20μ)* | 6.1576 × 10$^6$ | 427.2 | 128.8 |
| CV (%) | 74.7 | 2.56 | 2.26 |
| HTCR (ppm/° C.) | −953.4 | 151.0 | 157.3 |

TABLE IV-continued

Composition in wt % and electrical properties

| | Example No. | | |
|---|---|---|---|
| | 18 | 19 | 20 |
| σ$_{HTCR}$ (ppm/° C.) | ±328.0 | ±8.8 | ±10.2 |
| CTCR (ppm/° C.) | −1385.0 | 184.1 | 269.1 |
| σ$_{CTCR}$ (ppm/° C.) | ±939.0 | ±8.4 | ±3.5 |

*dried thickness of 1 × 1 mm$^2$ was 21μ (average of 40 resistors), R is normalized to nominal thickness of 20μ.

Table IV shows that the Ex. 1 conductive phase behaves in a similar fashion to conductive phases used in current thick film resistors. At 40 wt % conductive phase (ex. 20), the TCR is positive and small for both the HTCR as well as the CTCR. The resistance spread is very tight as judged by the small coefficient of variance. At 30 wt % conductive phase (ex. 19) the resistance is higher, TCR small and positive and the coefficient of variance is small. At 20 wt % conductive phase (ex. 18) the resistance is very high and TCR decreased and became negative. Negative TCR is expected since ex. 7 glass is a bismuthate glass and bismuthate glasses are known to impart negative TCR. The zircon filler was added to raise the composite viscosity during firing. However, as will become evident from the following examples, it also acts to raise the TCR in these compositions.

EXAMPLES 21–29

Compositions and properties are given in Table V. Examples 21 to 25 illustrate the electrical properties of system based on Ex. 1 conductive phase with Ex. 6 glass without zircon. Examples 26 to 29 illustrate the electrical properties of a system based on Ex. 1 conductive phase, Ex. 8 glass and zircon. It is clear that Examples 26 to 29, formulated with zircon, have higher (more positive) TCR than Examples 21 to 25 which were formulated without zircon. These examples also illustrate the resistance range.

TABLE V

Composition in wt % and electrical properties

| | Example No. | | | | | | | | |
|---|---|---|---|---|---|---|---|---|---|
| | 21 | 22 | 23 | 24 | 25 | 26 | 27 | 28 | 29 |
| Ex. 1 Conductive phase | 20.0 | 40.0 | 30.0 | 17.50 | 15.0 | 40 | 30.0 | 20.0 | 15.0 |
| Ex. 6 Glass | 50.0 | 30.0 | 40.0 | 52.50 | 55.0 | — | — | — | — |
| Ex. 8 Glass | — | — | — | — | — | 25 | 35.0 | 45.0 | 50.0 |
| Zircon | — | — | — | — | — | 5.0 | 5.0 | 5.0 | 5.0 |
| Organics | 30.0 | 30.0 | 30.0 | 30.0 | 30.0 | 30.0 | 30.0 | 30.0 | 30.0 |
| R (KΩ/□) | 55 | 0.377 | 16.7 | 144 | 288 | 0.0893 | 0.93 | 4.6 | 18.2 |
| CV (%) | 7 | 11.7 | 7.7 | 16.0 | 14 | 6.08 | 8.28 | 11.9 | 8.55 |
| Fired thickness (μ) | 14 | 9.2 | 12.7 | 9.1 | 10 | 15.0 | 13.0 | 13.5 | 12.8 |
| HTCR (ppm/° C.) | −748 | −194 | −722 | −834 | −887 | 150.6 | −100.8 | −200.3 | −286.3 |
| σ$_{HTCR}$ (ppm/° C.) | | | | | | | | | |
| CTCR (ppm/° C.) | −1387.6 | −419 | −1369.5 | −1667.4 | −1769.4 | 168.0 | −248.3 | −434.1 | −565.5 |
| σ$_{CTCR}$ (ppm/° C.) | | | | | | | | | |

EXAMPLES 30–34

Table VI illustrates the electrical properties of Ex. 1 conductive phase with examples 9 and 10 glasses. These commercially available lead glasses are typical of glasses used in current thick film resistor compositions. Table VI shows that Ex. 1 conductive phase behaves like lead ruthenate with leaded glass (Examples 30, 32 and 34). Composition of Examples 30 and 31 shows that the Ex. 10 glass, which contains more Al$_2$O$_3$, results in an increase in resistance, about one order of magnitude, at the same loading of conductive phase. TCR is positive and the TCR gap (HTCR-CTCR) is small. In addition, the TCR is positive and small at high resistance, a very desirable property.

TABLE VI

Compositions in wt % and electrical properties

| | Example No. | | | | |
|---|---|---|---|---|---|
| | 30 | 31 | 32 | 33 | 34 |
| Ex. 1 Cond. phase | 20.0 | 20.0 | 15.0 | 20.0 | 40.0 |
| Ex. 9 glass | 50.0 | — | 55.0 | 45.0 | 30.0 |
| Ex. 10 glass | — | 50.0 | — | — | — |
| Zr SiO$_4$ | — | — | — | 5.0 | — |
| Organics | 30.0 | 30.0 | 30.0 | 30.0 | 30.0 |
| R (Ω/□) | 73175 | 837173 | 3636200 | 97110 | 179.9 |
| CV (%) | 4.08 | 9.31 | 26.42 | 9.54 | |
| HTCR (ppm/° C.) | 257.6 | −13.4 | | 206.2 | 585.6 |
| $\sigma_{HTCR}$ (ppm/° C.) | ±6.0 | ±9.6 | | ±8.5 | ±16.1 |
| CTCR (ppm/° C.) | 237.3 | −102.7 | −87.0 | 147.6 | 792.4 |
| $\sigma_{CTCR}$ (ppm/° C.) | ±6.6 | ±9.7 | ±88.0 | ±13.1 | ±17.4 |

EXAMPLES 35–37

Table VII illustrate the effect of mixed glasses on electrical properties. Examples 35 to 37 were formulated with fixed concentration of Ex. 1 conductive phase (30 wt %) and varying ratio of Ex. 8 glass to Ex. 3 glass. Table VI shows that as the ratio Ex. 3 glass/Ex. 8 glass increases the resistance increases and the TCR decreases. This behavior can be utilized to adjust resistance, TCR and to obtain lower noise and better voltage performance; noise and better voltage performance improve with the increase in the conductive phase concentration.

TABLE VII

Compositions in wt % and electrical properties

| | Example No. | | |
|---|---|---|---|
| | 35 | 36 | 37 |
| Ex. 1 Conduct.phase | 30.0 | 30.0 | 30.0 |
| Ex. 8 Glass | 30.0 | 20.0 | 10.0 |
| Ex. 3 Glass | 10.0 | 20.0 | 30.0 |
| Organics | 30.0 | 30.0 | 30.0 |
| R (KΩ/□) | 0.45 | 1.53 | 7.5 |
| CV (%) | 4.5 | 5.8 | 8 |
| Fired thickness ($\mu$) | 15.7 | 12.6 | 12.0 |
| HTCR (ppm/° C.) | 73.4 | −81.9 | −266.6 |
| $\sigma_{HTCR}$ (ppm/° C.) | | | |
| CTCR (ppm/° C.) | 11.7 | −224.3 | −536.8 |
| $\sigma_{CTCR}$ (ppm/° C.) | | | |

Pellets similar to Example 17 were prepared with Example 1 conductive phase, Example 4 and Example 5 glasses and zircon. Compositions are given in Table VIII and properties in Table IX. Five pellets were prepared for each composition and are identified by the numbers following the example numbers, i.e., pellet #4 of Example 38 is 38-4. Pellets 1 to 3 were processed by process I and pellets 4 and 5 by process II (cofiring). Table IX shows that Example 1 conductive produces very low resistance with Example 4 glass in process I, and higher resistance in process II. The TCR is high and positive. With Example 5 glass, which has a lower softening point than Example 4 glass, the pellets 39-1, 39-2 and 39-3 (process I) deformed to preclude meaningful comparison. Pellets 4 and 5, i.e., 39-4 and 39-5 made by process II, had higher resistance and lower TCR; one pellet 39-4 had negative TCR and 39-5 with lower resistance (134 Ω) had positive TCR. According to Table III, the estimated resistivities are slightly larger than the measured resistance at room temperature, therefore, we may assume that the resistivities of 39-4 and 39-5 are about 700 and 150 Ω.cm respectively. Translation of these resistivities to thick film resistors via:

$$R = \rho \frac{1}{w \cdot d}$$

wherein R is resistance in Ω, ρ resistivity in Ω. cm, 1 length in cm, w width in cm, and d thickness in cm; and assuming one square, i.e., 1=w, then R=ρ/d and for typical thick film resistor d~10$\mu$=10$^{-3}$ cm, one obtains that resistivities of 700 and 150Ω cm translate to 700 000Ω/ and 150 000Ω/ thick film resistances.

TABLE VIII

Pellets composition in wt %

| | Example No. | |
|---|---|---|
| Ingredients | 38 | 39 |
| Example 4 glass | 65.0 | — |
| Example 5 glass | — | 65.0 |
| Example 1 conductive | 15.0 | 15.0 |
| Zr SiO$_4$ | 20.0 | 20.0 |

TABLE IX

Resistances (Ω), resistivities (Ω cm) dimensions and processing procedure of pellets.

| Example No. | Dimensions | | Resistance (Ω) | | Resistivity (Ω cm) | TCR (ppm/° C.) | Processing Procedure |
|---|---|---|---|---|---|---|---|
| | D (mm) | H (mm) | RT | 125° C. | | | |
| 38-1 | 5.72 | 1.59 | 0.75 | 0.86 | 1.21 | 1396 | Process I |
| 38-2 | 5.70 | 1.56 | 0.71 | 0.81 | 1.16 | 1341 | " |
| 38-3 | 5.73 | 1.52 | 0.73 | 0.84 | 1.24 | 1435 | " |
| 38-4 | — | — | 18.0 | 19.30 | — | 687.8 | Process II |
| 38-5 | — | — | 5.06 | 5.51 | — | 846.9 | " |
| 39-1 | — | — | * | — | — | — | Process I |
| 39-2 | — | — | * | — | — | — | " |
| 39-3 | — | — | * | — | — | — | " |
| 39-4 | — | — | 689 | 679 | — | −138.2 | Process II |
| 39-5 | — | — | 134 | 138.7 | — | 334.0 | " |

* Pellets deformed.

EXAMPLES 40–46

The theoretical relationship between the pellet's resistivity and the expected resistance in thick film resistor, i.e., R=ρ/d wherein R is the thick film resistance in Ω/, d is the fired film thickness and p is the pellet resistivity, was applied to Examples 38 and 39: paste compositions based on Example 39 and blend of 38 and 39 and modifications of these pastes were prepared. Their compositions and electrical properties are given in Table X. The theoretical relationship mentioned above is expected to apply if the pastes do not interact with the substrate and the terminations. It is well known that lead-based thick film compositions interact with the substrate and the terminations strongly. These leadless thick film compositions, examples 40 and 41, had very high resistances: R>240 MΩ/ for the 1×1 mm$^2$ resistors. Examples 42 and 43 are modifications of examples 40 and 41, in which the conductive phase concentration was increased. Table X shows that examples 42 and 43 have resistances in the useful ranges with positive HTCR (Example 43) and negative HTCR (Example 42).

Example 44 is 1:1 blend between examples 42 and 43, and Example 45 is a 2/3:1/3 blend between Example 43 and Example 41, respectively. Example 46 is 1:1 blend between Example 41 and Example 43.

Example 46 was made on three roll mill and represents a modification of Example 45. The electrical properties show resistance in the range of 10 kΩ/ to 100 kΩ/ with positive TCR.

TABLE X

Compositions in wt % and electrical properties

| | Ex. No. | | | | | | |
|---|---|---|---|---|---|---|---|
| | 40 | 41 | 42 | 44 | 44 | 45 | 46 |
| ex. 1 conductive | 10.50 | 10.50 | 31.50 | 31.50 | 31.50 | 24.50 | 20.00 |
| ex. 5 glass | 36.40 | 45.50 | 25.20 | 31.50 | 28.35 | 36.17 | 39.50 |
| ex. 6 glass | 9.10 | — | 6.30 | — | 3.15 | — | — |
| ZrSiO$_4$ | 14.00 | 14.00 | 7.00 | 7.00 | 7.00 | 9.33 | 10.50 |
| Organic Vehicle | 30.00 | 30.00 | 30.00 | 30.00 | 30.00 | 30.00 | 30.00 |
| R (KΩ/) | * | * | 17.866 | 0.669 | 29.88 | 4.049 | 18.85 |
| CV (%) | | | 5.60 | 7.19 | 26.51 | 10.93 | 8.00 |
| HTCR (ppm/° C.) | | | −347.3 | 462.6 | −490.5 | 220.6 | 170.2 |
| σ$_{HTCR}$(ppm/° C.) | | | ±41.2 | ±33.6 | ±56.5 | ±40.5 | ±31.5 |
| CTCR (ppm/° C.) | | | — | — | — | — | 61.8 |
| σ$_{CTCR}$(ppm/° C.) | | | — | — | — | — | ±42.0 |
| Dry thickness (μ) | | | — | — | — | — | — |

* Resistance too high > 240 MΩ

EXAMPLES 47–49

TABLE XI

Compositions in mole % and glass properties*

| | Example No. | | |
|---|---|---|---|
| | 47 | 48 | 49 |
| SiO$_2$ | 55.0 | 55.0 | 50.0 |
| B$_2$O$_3$ | 10.0 | 10.0 | 15.0 |
| BaO | 12.0 | 3.24 | 3.24 |
| SrO | 5.0 | 3.24 | 3.24 |
| CaO | 10.0 | 3.24 | 3.24 |
| CuO | — | 2.16 | 2.16 |
| ZnO | — | 15.12 | 15.12 |
| K$_2$O | 3.0 | 3.00 | 3.00 |
| Nd$_2$O$_3$ | 5.0 | 5.0 | 5.00 |
| α$_{25-300°C.}$(10$^{-6}$/° C.) | 8.47 | 6.25 | 6.23 |
| Tg (° C.) | 675 | 599 | 597 |
| Td (° C.) | 712 | 662 | 646 |

*α$_{25-300°C.}$ is the linear coefficient of expansion in units of 10$^{-6}$/° C.
Tg is the glass transition temperature in ° C.
Td is the dilatometer softening point in ° C. This temperature corresponds to the maximum in the expansion curve.

Example 47 is a modification of example 5 (Table I) in which K$_2$O and Nd$_2$O$_3$ were substituted for part of BaO and CaO. Example 47 still has high expansion. Examples 48 and 49 illustrate how to decrease the expansion to the desired range (~6×10$^{-6}$/° C.) and simultaneously decrease the softening properties (as expressed by the decrease in Tg or Td). Nd$_2$O$_3$ is used as an example of rare earth oxides. Other rare earth oxides can be used as such, or their mixtures.

Compositional range of glasses of table XI is (in mole %):

| | |
|---|---|
| SiO$_2$ | 40–60 |
| B$_2$O$_3$ | 1–20 |
| BaO | 1–15 |
| SrO | 1–6 |
| CaO | 1–15 |
| CuO | 0.5–3 |
| ZnO | 0.5–20 |
| M$_2$O$_3$ | 0.25–7 |
| M'$_2$O | 0.25–4 |

M' is Li, Na, K or mixture thereof.
M is rare earth element of atomic number 57 to 71 inclusive, or mixture thereof.

Table XII presents the electrical properties of resistor compositions formulated with example 48 glass, example 1 conductive and two TCR modifiers Nb$_2$O$_5$ and TiO$_2$. Examples 50 to 53 were prepared on the muller and example 54 is a roll milled composition derived from examples 50 and 51. TiO$_2$ is a very efficient TCR modifier as examples 52 and 53 show; it raises the resistance and lowers the TCR. These examples also illustrate how to raise the resistance and maintain positive TCR (example 54) and how to lower the TCR at a given conducting phase concentration (examples 52 and 53). Examples 50 and 51 show that Nb$_2$O$_5$ is not as efficient as TiO$_2$ in lowering the TCR in these compositions.

TABLE XII

Compositions in wt % and electrical properties

| | Example No. | | | | |
|---|---|---|---|---|---|
| | 50 | 51 | 52 | 53 | 54 |
| Ex. 1 conductive | 20.0 | 15.0 | 20.0 | 20.0 | 13.75 |
| Ex. 48 glass | 39.0 | 44.0 | 39.0 | 38.5 | 45.25 |
| ZrSiO$_4$ | 10.5 | 10.5 | 10.5 | 10.5 | 10.50 |
| Nb$_2$O$_2$ | 0.5 | 0.5 | — | — | 0.50 |
| TiO$_2$ | — | — | 0.5 | 1.0 | — |
| Organic vehicle | 30.0 | 30.0 | 30.0 | 30.0 | 30.0 |
| Rav (kΩ/) | 1.61 | 14.27 | 8.52 | 42.7 | 470.0 |
| HTCR(ppm/° C.) | 1223.8 | 1501.2 | 403.7 | −370.1 | 428.2 |
| σ$_{HTCR}$(ppm/° C.) | ±89.4 | ±73.0 | ±59.7 | ±157.1 | ±246.2 |
| CTCR(ppm/° C.) | 1384.2 | 1893.8 | 486.3 | −563.8 | 524.4 |
| σ$_{CTCR}$(ppm/° C.) | ±168.5 | ±102.9 | ±76.2 | ±238.8 | ±288.5 |

TABLE XIII

Compositions in wt % and electrical properties

| | Example No. | | |
|---|---|---|---|
| | 55 | 56 | 57 |
| Ex.1 conductive | 12.5 | 12.5 | 12.5 |
| Ex.48 glass | 46.5 | 44.0 | 45.5 |
| ZrSiO$_4$ | 10.5 | 13.0 | 12.0 |
| Nb$_2$O$_5$ | 0.5 | 0.5 | — |
| Organics | 30.0 | 30.0 | 30.0 |
| R (M/) | * | * | ** |

* High resistance > 250 (M/)
** High resistance 100–200 (M/) range

Examples 55 to 57 show that at 12.5 wt % conductive, the resistance is very high when $Nb_2O_5$ is present (examples 55 & 56) and it is in the range of 100 to 200 M / when $Nb_2O_5$ is not included (example 57). Resistor compositions in the range of 1 M / and higher can be formulated with mixtures (blends) consisting of example 54 and composition of Table XIII.

While specific embodiments of the invention have been described for the purpose of illustration, it will be understood that the invention may be carried into practice by skilled persons with many modifications, variations and adaptations, without departing from its spirit or exceeding the scope of the claims.

What is claimed is:

1. Film compositions that comprise, a glass-containing dielectric phase and
   as a conductive phase, pyrochlore-related compounds of the general formula $M_{2-x}Cu_xRu_2O_{6+\delta}$, wherein M is a rare earth metal selected from the rare earth metals of atomic number 60–71 inclusive.

2. Compositions according to claim 1, wherein X=0.2–0.4 and $\delta$=0–1.

3. Compositions according to claim 1, wherein the dielectric phase consists of or comprises, as a main component, a glass phase.

4. Compositions according to claim 3, wherein the glass phase comprises by mole % 40–60% $SiO_2$, 1–20% $B_2O_3$, 1–15% BaO, 1–6% SrO, 1–15% CaO, 0.5–3% CuO, 0.5–20% ZnO, 0.25–7% $M_2O_3$, 0.25–4% $M'_2O$, wherein M' is Li, Na, K or mixture thereof, and M is a rare earth element of atomic number 57 to 71 inclusive, or mixture thereof; and 0–3% of a metal fluoride in which the metal is selected from the group consisting of alkali and alkaline earth metals.

5. Compositions according to claim 3, wherein the glass phase comprises by mole % 40 to 65% $SiO_2$, 10 to 20% $Bi_2O_3$, 0.1 to 3% $Al_2O_3$, and glass modifiers in total amount of 15 to 25%, wherein said glass modifiers comprise 1 to 23% ZnO, 0.1 to 5% CuO, 0.1 to 5% CaO and 0.1 to 2% MgO.

6. Compositions according to claim 3, wherein the glass phase comprises a blend of two glasses.

7. Compositions according to claim 6, wherein
   a) a first glass comprises by mole % 40–65% $SiO_2$, 1–15% $B_2O_3$, 12–27% BaO, 5–10% SrO, 5–15% CaO, 0–5% MgO, 0–5% $Al_2O_3$, 0–12% alkali metal oxides and 0–3% of a metal fluoride in which the metal is selected from the group consisting of alkali and alkaline earth metals; and
   b) a second glass comprises by mole % glass forming compounds in a total amount of 75 to 85% wherein, said glass forming compounds comprise 40 to 65% $SiO_2$, 10 to 20% $Bi_2O_3$, 0.1 to 3% $Al_2O_3$, and glass modifiers in total amount of 15 to 25%, wherein said glass modifiers comprise 1 to 23% ZnO, 0.1 to 5% CuO, 0.1 to 5% CaO and 0.1 to 2% MgO.

8. A composition according claim 3, wherein the glass phase comprises glasses chosen from the group consisting of Cd-free and Pb-free bismuthate glasses, alkaline earth borosilicate glasses, and mixture thereof.

9. A composition according to claim 3, wherein the glass phase is chosen from the group consisting of lead-containing silicate glasses, lead-containing borosilicate glasses and mixtures thereof.

10. Compositions according to claim 1, wherein the dielectric phase is selected from $Al_2O_3$, $SiO_2$, $ZrSiO_4$, $ZrO_2$, aluminosilicates and mixtures thereof.

11. Compositions according to claim 1, further comprising an organic vehicle.

12. Compositions according to claim 11, wherein the organic vehicle is a solution of resin in a solvent or mixture of solvents.

13. Compositions according to claim 1, further comprising a filler.

14. Compositions according to claim 13, wherein the filler is chosen from the group consisting of $Al_2O_3$, $SiO_2$, $ZrSiO_4$, $ZrO_2$ and aluminosilicates.

15. Compositions according to claim 1, comprising
   a) a dispersion of finely divided particles of the pyrochlore-related compound corresponding to the formula $M_{2-x}Cu_xRu_2O_{6+\delta}$, wherein M is a rare earth metal selected from the rare earth metals of atomic number 60–71 inclusive, X=0.2–0.4, $\delta$=0–1;
   b) glasses selected from the groups consisting of:
      (A) a glass phase comprising by mole % 40–60% $SiO_2$, 1–20% $B_2O_3$, 1–15% BaO, 1–6% SrO, 1–15% CaO, 0.5–3% CuO, 0.5–20% ZnO, 0.25–7% $M_2O_3$, 0.25–4% $M'_2O$, wherein M' is Li, Na, K or mixture thereof, and M is a rare earth element of atomic number 57 to 71 inclusive, or mixture thereof; and 0–3% of a metal fluoride in which the metal is selected from the group consisting of alkali and alkaline earth metals;
      (B) a glass phase comprising by mole % 40 to 65% $SiO_2$, 10 to 20% $Bi_2O_3$, 0.1 to 3% $Al_2O_3$, and glass modifiers in total amount of 15 to 25%, wherein said glass modifiers comprise 1 to 23% ZnO, 0.1 to 5% CuO, 0.1 to 5% CaO and 0.1 to 2% MgO;
      (C) a glass phase comprising a blend of two glasses;
      (D) a) a first glass comprises by mole % 40–65% $SiO_2$, 1–15% $B_2O_3$, 12–27% BaO, 5–10% SrO, 5–15% CaO, 0–5% MgO, 0–5% $Al_2O_3$, 0–12% alkali metal oxides and 0–3% of a metal fluoride in which the metal is selected from the group consisting of alkali and alkaline earth metals; and
         b) a second glass comprises by mole % glass forming compounds in a total amount of 75 to 85% wherein, said glass forming compounds comprise 40 to 65% $SiO_2$, 10 to 20% $Bi_2O_3$, 0.1 to 3% Al2O3, and glass modifiers in total amount of 15 to 25%, wherein said glass modifiers comprise 1 to 23% ZnO, 0.1 to 5% CuO, 0.1 to 5% CaO and 0.1 to 2% MgO; and
      (E) mixtures thereof; and
   c) dielectrics selected from the group consisting of $SiO_2$, $ZrSiO_4$ and $Al_2O_3$.

16. Compositions according to claim 15, wherein the rare earth metal is Neodymium.

17. Method of preparing pyrochlore-related compounds as defined in claim 1, which comprises firing an admixture of finely divided particles of CuO, $RuO_2$ and a metal oxide selected from the rare earth metal oxides of atomic number 60 –71 inclusive, at a temperature of at least 800° C., in a non-reducing atmosphere.

18. Method according to claim 17, for preparing compounds having the formula $Nd_{2-x}Cu_xRu_2O_{6+67}$, which comprises firing in air an admixture of finely divided particles of $Nd_2O_3$, CuO and $RuO_2$ at a temperature of 1000–1200° C.

19. Method of making film compositions according to claim 1, comprising preparing a powdered mixture of
   a) 5–90% by weight of an oxide of the formula $Cu_xM_{2-x}Ru_2O_{6+\delta}$, wherein M is a rare earth metal selected from the rare earth metals of atomic number 60–71 inclusive, x is a number in the range of 0.25 to 0.4, and δ is a number in the range of 0 to 1; and
   b) 95–10% by weight of dielectric materials.

20. Method according to claim 19, further comprising dispersing the powdered mixture in a liquid organic vehicle.

21. Method according to claim 19, wherein the oxide is chosen from the group consisting of $Nd_{1.70}Cu_{0.30}Ru_2O_{6+\delta}$, $Nd_{1.75}Cu_{0.25}Ru_2O_{6+\delta}$, and their mixtures wherein δ is a number in the range of 1 to 0.

22. Method according to claim 21, wherein the dielectric materials are chosen from the group consisting of glasses, oxides selected from $ZrSiO_4$, $Al_2O_3$, $SiO_2$, and mixture thereof.

* * * * *